(12) United States Patent
Eyuboglu et al.

(10) Patent No.: US 6,781,999 B2
(45) Date of Patent: Aug. 24, 2004

(54) BROADCASTING AND MULTICASTING IN WIRELESS COMMUNICATION

(75) Inventors: M. Vedat Eyuboglu, Concord, MA (US); Dae-Young Kim, Lexington, MA (US)

(73) Assignee: Airvana, Inc., Chelmsford, MA (US)

( * ) Notice: Subject to any disclaimer, the term of this patent is extended or adjusted under 35 U.S.C. 154(b) by 0 days.

(21) Appl. No.: 09/911,357

(22) Filed: Jul. 23, 2001

(65) Prior Publication Data

US 2003/0026240 A1 Feb. 6, 2003

(51) Int. Cl.[7] .................................. H04L 12/56
(52) U.S. Cl. ........................... 370/399; 370/432
(58) Field of Search ......................... 370/342–349, 370/443, 319–322, 232–235, 450–458, 350, 328–331, 401, 352, 230, 389–395, 360, 461; 455/435; 709/223–227, 217, 245

(56) References Cited

U.S. PATENT DOCUMENTS

| | | | |
|---|---|---|---|
| 5,426,637 A | * | 6/1995 | Derby et al. ................. 370/401 |
| 5,659,596 A | | 8/1997 | Dunn |
| 6,118,771 A | * | 9/2000 | Tajika et al. ................. 370/328 |
| 6,188,873 B1 | | 2/2001 | Wickman et al. |
| 6,230,012 B1 | * | 5/2001 | Willkie et al. ............... 455/435 |
| 6,370,127 B1 | * | 4/2002 | Daraiseh et al. ............ 370/328 |
| 6,473,411 B1 | * | 10/2002 | Kumaki et al. .............. 370/331 |

OTHER PUBLICATIONS

3GPP2 C.S0024, CDMA2000 High Rate Packet Data Air Interface Specification, Sep. 12, 2000.

C. Kenneth Miller, Multicast Networking and Applications, Addison–Wesley, 27–30, (1999).

\* cited by examiner

*Primary Examiner*—Kwang Bin Yao
*Assistant Examiner*—Prenell Jones
(74) *Attorney, Agent, or Firm*—Fish & Richardson P.C.

(57) ABSTRACT

In a radio access network, multicast packets are delivered each identified by a multicast network layer address representing a multicast group of access terminals. The multicast packets are delivered in one or more air link frames using a common control channel that is shared among access terminals in a sector. Each airlink frame carries a multicast air link address that identifies the multicast group of terminals.

17 Claims, 9 Drawing Sheets

BROADCASTING AND MULTICASTING IN WIRELESS COMMUNICATION

BACKGROUND

Figure 1:
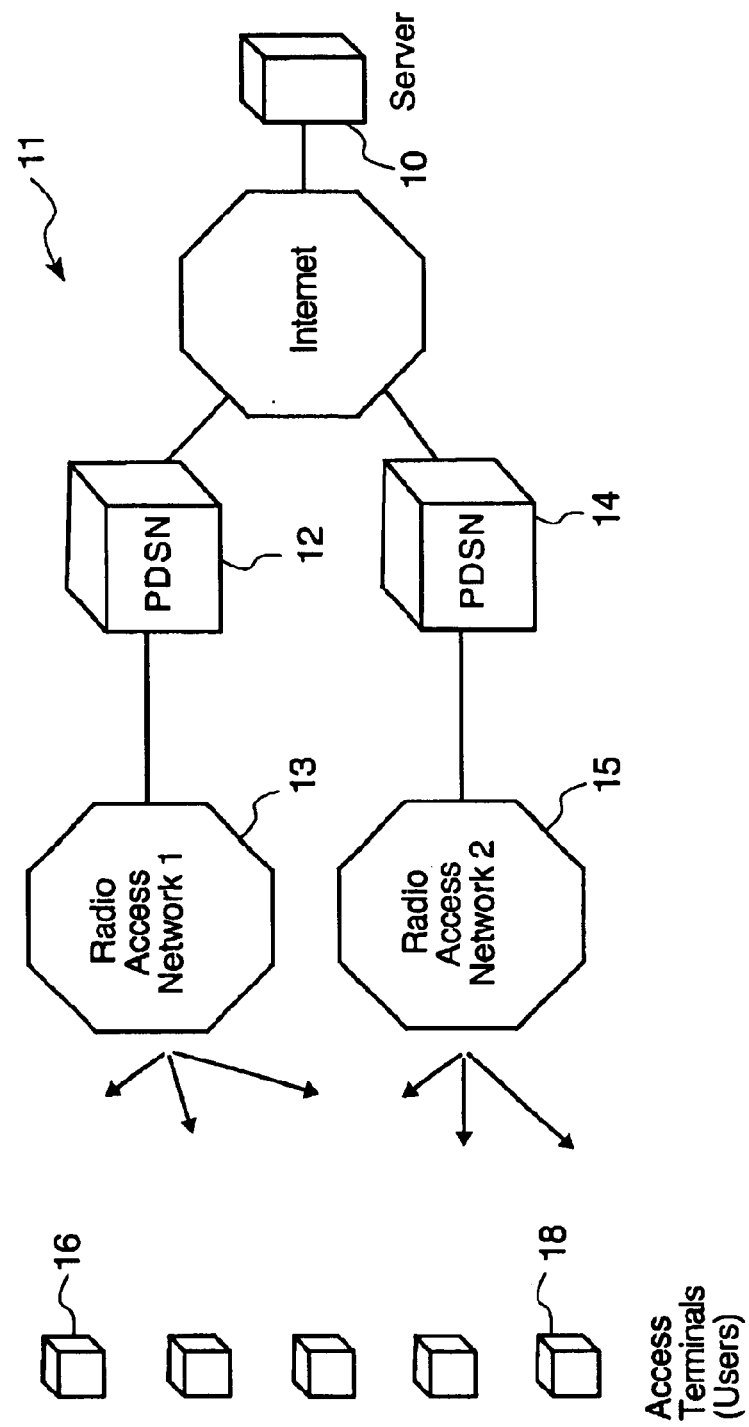
Figure 2:
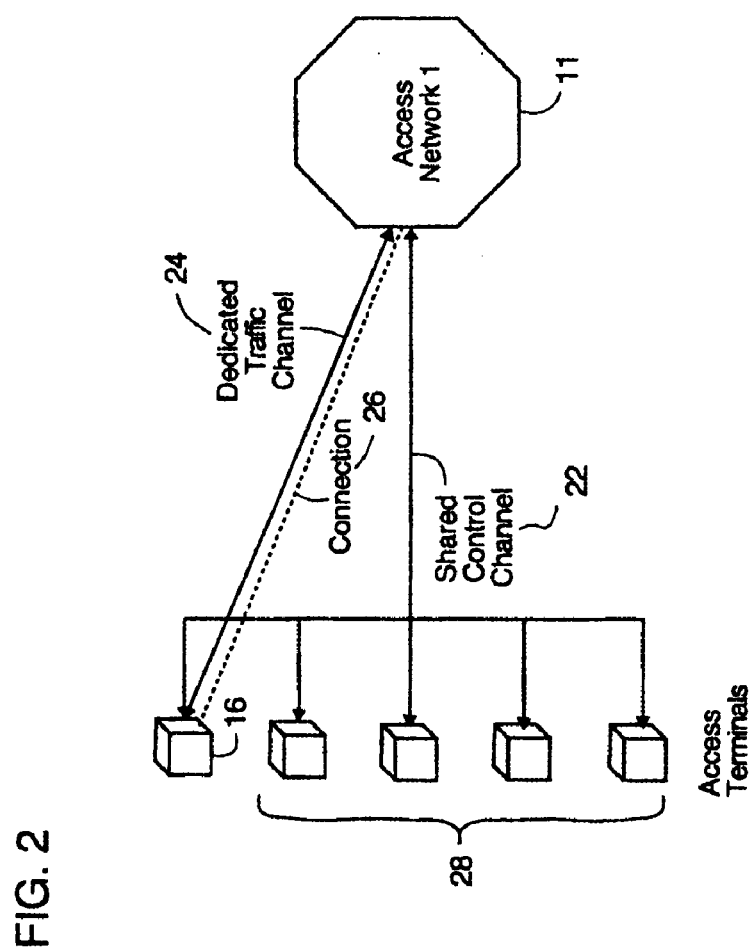

This invention relates to broadcasting and multicasting in wireless communication.

The following acronyms are used in this description.

| | |
|---|---|
| AT | Access Terminal |
| AN | Access Network |
| RNC | Radio Network Controller |
| RN | Radio Node |
| 1xEV-DO | 1xEV-Data Only |
| MAC | Medium Access Control |
| CH | Channel |
| SNP | Signaling Network Protocol |
| SLP | Signaling Link Protocol |
| PDSN | Packet Data Serving Node |

Introduction

Recently, the 3rd Generation Partnership Project 2 (3GPP2) approved a new wireless packet data air interface standard called IS-856, sometimes also referred to as 1xEV-DO (see 3GPP2 3GPP2 C.S0024, CDMA2000 *High Rate Packet Data Air Interface Specification*, Oct. 27, 2000). IS-856 supports high-speed wireless Internet access at speeds of up to 2.54 Mbit/s using only 1.25 MHz spectrum.

A feature of IS-856 is a high-speed forward link common control channel which operates at bit rates of 38.4 and 76.8 kbit/s. At such bit rates, it is possible to deliver a variety of broadcast or multicast applications and services. These include advertising, news distribution, emergency notification, real-time stock quotes, music and video streaming and others. Broadcasting and multicasting (we sometimes use the term "multicasting" in a way that includes both "broadcasting" and "multicasting") provide an efficient way of delivering the same content to multiple users by transmitting only one copy. Such efficiency is particularly important in wireless applications because of spectrum scarcity.

SUMMARY

In general, in one aspect, the invention features a method that includes, in a radio access network, delivering multicast packets each identified by a multicast network layer address representing a multicast group of access terminals. The multicast packets are delivered in one or more air link frames using a common control channel that is shared among access terminals in a sector. Each airlink frame carries a multicast air link address that identifies the multicast group of terminals.

Implementations of the invention may include one or more of the following features. The common control channel comprises the control channel of IS-856. The multicast air link address comprises a broadcast or multicast Access Terminal Identifier (ATI). The multicast packets are sent to the radio access network from a router through a radio network controller and a radio node to the sector. The router comprises a packet data serving node, and the multicast packets are sent to the radio access network using a multicast network layer tunnel. The network layer tunnel comprises an IP tunnel using the Generic Routing Encapsulation (GRE) protocol. The router uses a stateless simple link layer protocol to frame the network layer multicast packets for transmission to the access terminals. An access terminal is enabled to join or leave a multicast group. An access terminal joins a multicast group by sending a message to a multicast router. The multicast router comprises a Packet Data Serving Node (PDSN) or a Home Agent (HA) through the Radio Network Controller. An access terminal joins a multicast group by registering out-of-band at a web server, and the multicast router obtains the registration information from the web server. The packets are sent to the radio access network using a reliable protocol involving error detection and retransmission.

In general, in another aspect, the invention features a that includes, in a radio network, sending multicast packets from a router through a radio network controller and a radio node to a radio access network, the router using a stateless simple link layer protocol to frame the network layer multicast packets for transmission to access terminals in the sector.

Implementations of the invention may include one or more of the following features. The router comprises a packet data serving node, and the multicast packets are sent to the radio access network using a multicast network layer tunnel. The network layer tunnel comprises an IP tunnel using the Generic Routing Encapsulation (GRE) protocol. The multicast router comprises a Packet Data Serving Node (PDSN) or a Home Agent (HA). The airlink frames are sent repetitively in multiple Control Channel Cycles in order to reach dormant terminals. The radio access network sends a multicast page to multiple terminals in order to wake them up before the transmission of multicast data starts.

Other advantages and features will become apparent from the following description and from the claims.

DESCRIPTION (FIGS. 1, 2, and 5 through 10 show functional block diagrams.

Figure 3:
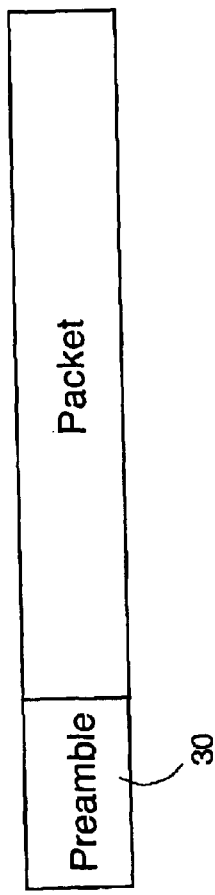
Figure 4:
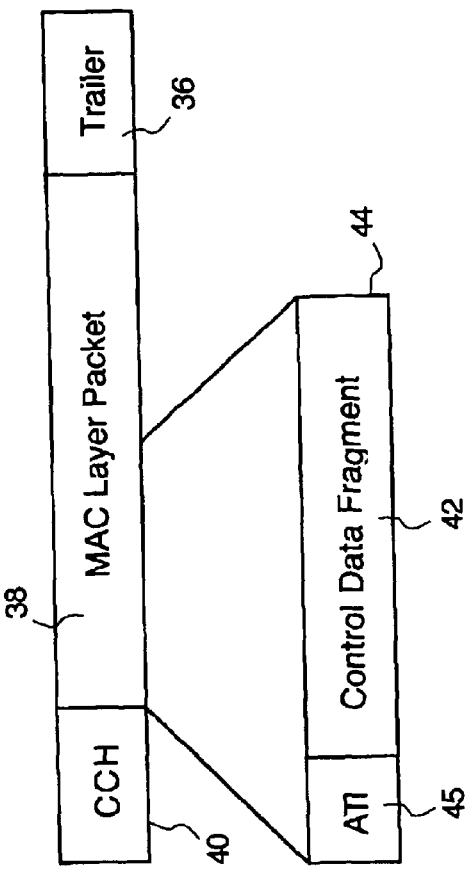
Figure 5:
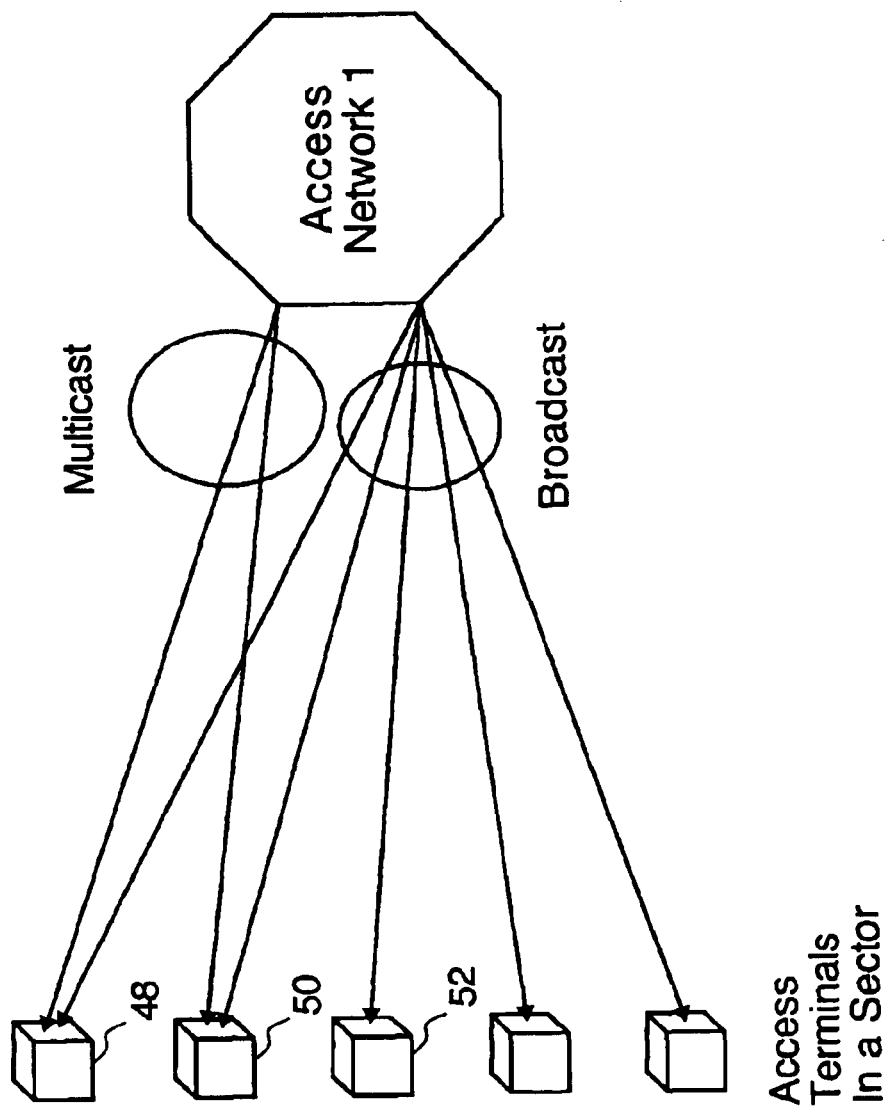
Figure 6:
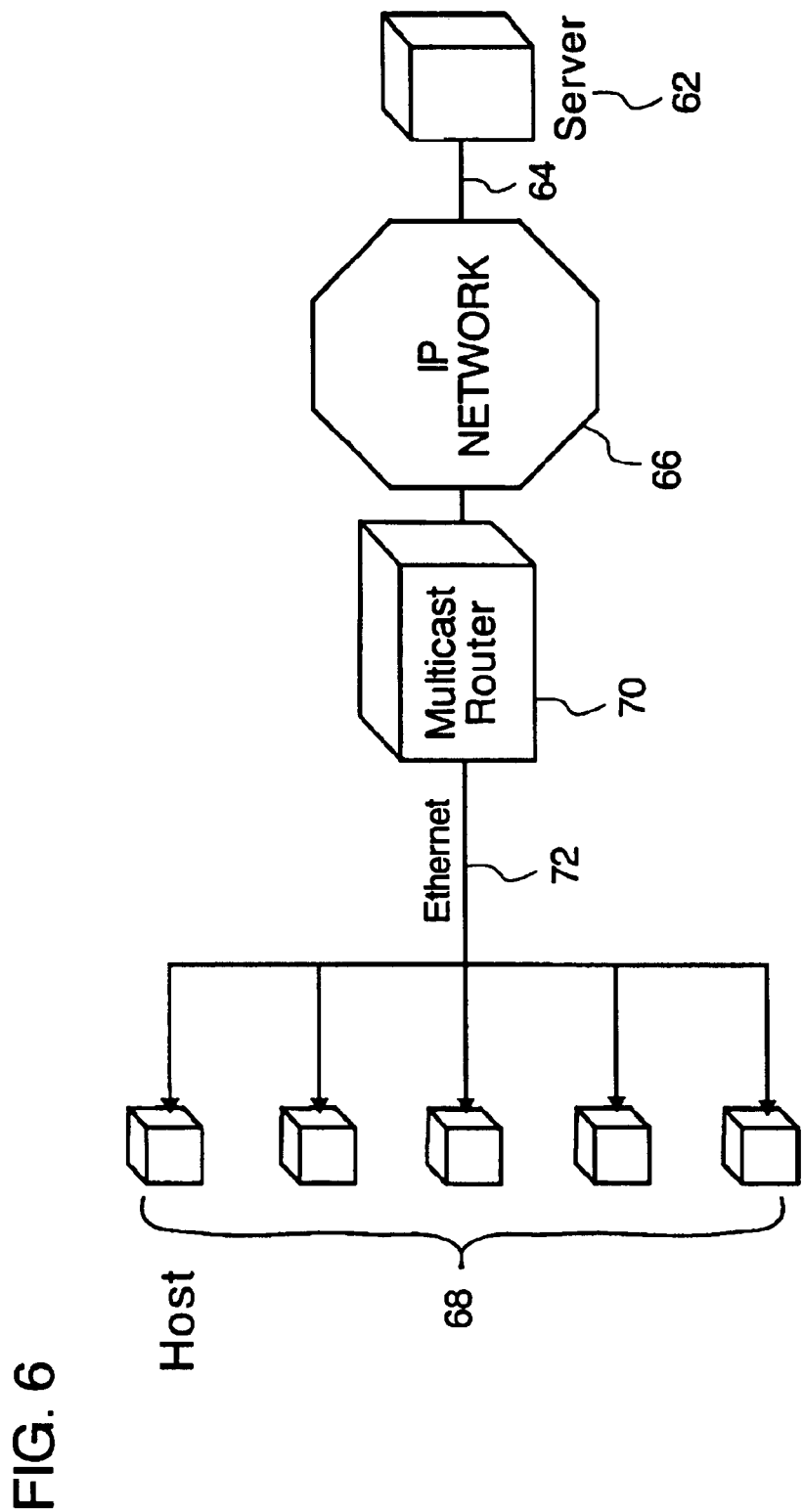

FIGS. 3 and 4 show packet structures.)

Here, we describe how broadcast and multicast applications can be supported in wireless networks based on IS-856. Many of the concepts described here also apply to other air interface standards, such as IS-2000 and 1xEV-DV.

As shown in FIG. 1, delivery of broadcast and multicast services on wireless networks requires two capabilities. First, the broadcast or multicast information needs to be delivered from a server (e.g., an Internet server or a push server) 10 to one or more Packet Data Serving Nodes (PDSN's) 12, 14. Such a server 10 may be locally serving the coverage area of only a single Packet Data Serving Node (PDSN) 12, or it may be globally simultaneously serving the coverage areas of several Packet Data Serving Nodes 12, 14. Second, the broadcast or multicast information needs to be delivered from the PDSN to one or more Radio Access Networks 13, 15 and then over the air to target users 16, 18. A Radio Access Network typically consists of a Radio Network Controller (RNC) and several Radio Nodes (RN's), where each RN typically supports operation over up to 6 sectors. In both cases, multicast or broadcast packets need to be transported efficiently, avoiding duplicate transmissions where possible, particularly over the air.

It is also desirable to support multicast applications where a wireless user 18 can not only receive multicast packets, but also send them 20. Examples of such applications include multipoint conferencing.

In IP networks that are wired, there are established standards (IP Multicast & IP Broadcast) for carrying broadcast and multicast traffic between IP hosts. It is reasonable to re-use these standards in wireless applications to the extent they do not seriously reduce bandwidth efficiency.

Operation of the Forward Link Control Channel in IS-856

The forward link (from the Access Network to the Access Terminal) of IS-856 supports two types of air link channels to carry user information: (1) a Control Channel 22, and (2) a Forward Traffic Channel 24. The Forward Traffic Channel 24 carries information from the Access Network to one specific access terminal. In order to receive information on the Forward Traffic Channel, an Access Terminal (AT) has to establish a so-called connection 26 with the Access Network. The Control Channel, on the other hand, is a shared physical layer channel that can be used to carry information from the Access Network to one or more AT's 16, 28.

In the IS-856 Physical Layer Specification, Forward Traffic Channel and Control Channel packets are sent over the air using time-division multiplexing. Basically, time is divided into slots of 1/600 seconds, and user packets (Forward Traffic Channel packets) are transmitted in 1, 2, 4, 8 or 16 time slots, depending on the transmission rate. Control Channel packets are always transmitted at 38.4 or 76.8 kbits/s using 16 or 8 time slots, respectively.

As shown in FIG. 3, each packet 28 (whether on the Control Channel or the Forward Traffic Channel) includes a physical layer preamble 30, which is used to indicate the packet type. Specifically, the preamble indicates whether the packet is a Control Channel packet at 38.4, a Control Channel packet at 76.8 kbit/s or a Forward Traffic Channel packet. The preamble carries coded information that identifies the recipient of a Forward Traffic Channel packet based on a connection identifier often referred to as a MAC Index.

Control Channel packets are transmitted in so-called capsules of which there are two types. A Synchronous Capsule consists of one or more Control Channel Packets transmitted at the beginning of a Control Channel Cycle. Each Control Channel Cycle has a duration of 256 slots (426.7 msec). An Asynchronous Capsule also consists of one or more Control Channel Packets, but like a Forward Traffic Channel packet, these packets can be transmitted in any time slot.

A Control Channel packet carries 1024 bits, which includes a trailer 36 which consists of a 16-bit Physical Layer CRC and six so-called tail bits for Forward Error Correction. The remaining 1002 bits form a Control Channel MAC Layer packet 38. A Control Channel MAC Layer packet 38 includes an 8-bit Control Channel Header 40 which indicates the type of the Control Channel Capsule, among other things.

IS-856 supports a flexible multiplexing layer, which allows the Access Network to send different control data fragments 42 to different sets of users in the same Control Channel packet. Each data fragment is preceded by a 2–6 byte fragment header 44 that includes, among other things, address information in a so-called "ATI Record" field 45. An ATI Record can be 2 or 34 bits long, and includes a 2-bit ATI Type and an ATI value, as shown in the table below. The ATI uniquely identifies the recipient(s) of a control data fragment and serves as the primary link layer addressing mechanism in IS-856, similar to the MAC address found in local area networking.

| ATI Type | ATI Type Description | ATI Length (bits) |
| --- | --- | --- |
| '00' | Broadcast ATI (BATI) | 0 |
| '01' | Multicast ATI (MATI) | 32 |
| '10' | Unicast ATI (UATI) | 32 |
| '11' | Random ATI (RATI) | 32 |

The broadcast ATI is used when data is being sent to all AT's 48, 50, 52 in a given sector 46. The multicast ATI is used when data is being sent to one or more AT's in a given sector.

In the IS-856 standard, currently the broadcast ATI is only used to broadcast IS-856-specific signaling information from the Access Network. However, the broadcast/multicast ATI's can be used to broadcast/multicast user information over the air. In this approach, we have avoided changes to the IS-856 standard and also made our additions compatible with the standard in the sense that our approach will not affect any future backward-compatible extensions to IS-856. Our scheme can be supported in Access Network and Access Terminal equipment in software or firmware without any changes to ASIC's or FPGA's that implement the lower layers of the IS-856 standard such as the MSM5500 and CSM5500 chip sets from Qualcomm. Furthermore, our scheme is fully compatible with the IS-856 standard in the sense that all AT's that do not implement our scheme can co-exist with AT's that do implement it.

Paging and Other Methods to Reach Dormant Terminals

In order to preserve battery power, a battery-powered Access Terminal will typically go into a Sleep Mode after a period of inactivity. In Sleep Mode, the terminal powers down most of its internal components. But in order to remain synchronized with the network and to check for possible incoming paging messages, it wakes up once every 12 Control Channel Cycles (5.12 secs) in time to receive a Synchronous Capsule. With the help of global time synchronization in an IS-856 network, the Access Terminal knows exactly when to wake up to receive the Synchronous Capsule. Different Access Terminals may check the Synchronous Capsule in different ones of 12 consecutive Control Channel Cycles. This gives AT's flexibility by allowing them to monitor the Control Channel in a specific Control Channel Cycle of their choice.

When the network receives unicast data for an idle Access Terminal, it sends a page message to that Access Terminal in the specific Control Channel Cycle that the Access Terminal is monitoring. The terminal then initiates the procedures to set up a unicast connection to exchange data with the PDSN over Traffic Channels. In broadcast/multicast applications, dealing with terminals that use the sleep mode is slightly more complex and the most efficient approach depends on the nature of the application.

We expect that there will be two classes of broadcast/multicast applications: network-initiated (push) applications and terminal-initiated applications. Further, network-initiated applications can be broken into two groups: those that send a small amount of data (advertising, emergency information, stock alerts) and those that send a large amount of data (detailed news, streaming multimedia, multipoint conferencing).

In network-initiated applications that send a small amount of data, one can reach all AT's, including those that are in a Sleep State, without requiring paging, by sending the same data 12 times, once in every Control Channel Cycle, to make sure it will be received by all AT's. Obviously, this will substantially reduce the available throughput. However, for applications that send very small amounts of data (say, a few hundred bytes), this should be acceptable. The efficiency of this approach can be improved by having the Access Network configure the AT's to monitor the control channel only in certain Control Channel Cycles when the broadcast/multicast information is delivered. Alternatively, AT's may be manually configured to check the Control Channel more frequently. This would increase the available throughput, but at the expense of increased power consumption.

In network-initiated applications that produce large amounts of data, a paging mechanism is used to request the AT's to monitor the Control Channel. By sending a page message directed to a Broadcast/Multicast address, one can direct either all AT's (broadcast) or AT's that belong to a specific Multicast Group, to monitor the Control Channel.

The current IS-856 specification supports a unicast paging mechanism, but broadcast/multicast paging is not allowed. However, broadcast/multicast paging can be enabled easily by simply allowing the Access Network to send paging messages to a broadcast/multicast address. Such a broadcast/multicast paging message may have to be sent in as many as 12 consecutive Synchronous Capsules. Shortly after sending the page, the Access Network can start transmitting the broadcast/multicast data. Access Terminals can be configured to go back to the Sleep Mode after some period of inactivity or based on some end of data message received from the broadcast/multicast server. Alternatively, the Access Network may send a broadcast/multicast Connection Close message. Presently, in IS-856, this message is used only for unicast connections, but it can be extended to support the broadcast/multicast application.

In terminal-initiated broadcast/multicast applications, a broadcast/multicast session is initiated by the Access Terminal. This triggers a transition to the Monitor State where the AT will remain for the duration of the broadcast/multicast session. As a result, in these applications broadcast/multicast information may be sent in any time slot, in Synchronous or Asynchronous Control Channel Capsules.

Overview of IP Multicast

IP Multicast allows the efficient delivery of IP datagrams 64 from a server 62 to multiple hosts 68 over an IP network 66. When an IP packet with a multicast destination address arrives at a multicast router 70, the router forwards it to all of its local interfaces that have at least one member in the multicast group represented by that address. In wireline networks, hosts typically attach to their local multicast router via Ethernet 72. The multicast router then constructs a multicast Ethernet address by mapping the lower 28 bits of the IP multicast address (Group D IP Address), to the lower 23 bits of the 48-bit multicast Ethernet address (the remaining 25 bits form the multicast prefix). It then sends the IP multicast packets to its local hosts encapsulated in Ethernet frames using the multicast Ethernet address as the link layer destination address. All hosts that belong to the multicast group program their Ethernet interface cards to receive these multicast frames and pass the received IP multicast packets to the higher layers. Since the mapping from the IP multicast address to the Ethernet multicast address is not unique, up to $2^5=32$ different multicast addresses may be received by the interface card. The driver of the interface card or some higher layer entity then filters out the undesired packets.

IP Multicast also allows users to dynamically join or leave a multicast group using the Internet Group Management Protocol (IGMP). IP hosts acquire the multicast IP address typically out-of-band (e-mail, directory look-up, etc.) (see, for example, C. Kenneth Miller, *Multicast Networking and Applications*, Addison-Wesley, 1999.).

Currently, there are 3 versions of IGMP. Here, we focus on IGMPv1 and IGMPv2. When a host wants to join a multicast group, it sends an IGMP Host Membership message to its local multicast router. The multicast router then exchanges routing information with other routers in the IP network to ensure that the multicast packets sent by the host can be correctly routed to other members of the multicast group and multicast packets sent by other members of the group can be correctly received.

In IGMPv1, there is no explicit Leave Group message for the hosts to notify the multicast router when they leave a multicast group. Instead, the router relies on so-called IGMP Query messages to determine if there is at least one member of the multicast group on a given interface. The router broadcasts the IGMP Query message to that interface at regular intervals. Upon receipt of the Query message, each member of the multicast group initiates the process of responding with a Host Membership Report. A Host Membership Report is sent to the multicast address (but only locally), thereby allowing all local hosts to hear the reports sent by other members attached to the same interface. Hosts use a random back-off before they send a Host Membership Report, and they suspend their transmission if another host in the group responds before them. This prevents unnecessary Host Membership Report transmissions from hosts to their local router. As long as at least one host remains in a given multicast group on a given interface, the multicast router keeps forwarding packets to that interface.

This approach can involve significant time delays between the time when the last user leaves the group and the time when this state is recognized by the router. Also, IGMPv1 assumes that the underlying transmissions from the router to the local hosts is accomplished over a shared medium with a MAC protocol, where sending a multicast packet to multiple members uses up the same bandwidth as sending the same packet to only one member. However, if bandwidth-limited point-to-point links were used between the router and the hosts, it would become necessary for the router to keep track of all members of the multicast group and immediately stop forwarding multicast packets to users as soon as they leave a multicast group.

IGMPv2 added an explicit Leave Group message which somewhat alleviates these problems. Here, when a host leaves a multicast group, it sends a Leave Group message to the multicast router. To check for any remaining members of a group, the router immediately sends an IGMP Query message specific to that multicast group and hosts respond using the same backoff procedure as in IGMP v1. If no response is received within a certain period of time, the multicast router stops forwarding packets belonging to that multicast group over that interface. The Leave Group message reduces the time delay mentioned earlier and allows the router to keep track of the exact membership list for the multicast group.

IP Multicast Using Dedicated Traffic Channels

A simple approach to supporting IP multicast in wireless networks is to use the PPP (point-to-point protocol) link 95 between the PDSN 90 and the Access Terminals 92. PPP runs over dedicated forward and reverse traffic channels between the Access Network and the Access Terminals. When an AT wants to transmit or receive multicast data over dedicated traffic channels in dormant state, it initiates the procedure to set-up a bi-directional connection using the connection establishment procedures of IS-856. When the network receives multicast packets for a dormant AT, it first pages the AT via the control channel using the paging mechanism defined in IS-856, and the AT then initiates the procedure to set-up a bi-directional connection. The PPP link between the PDSN and the AT is set-up when the AT first registers with the IS-856 network.

Figure 8:
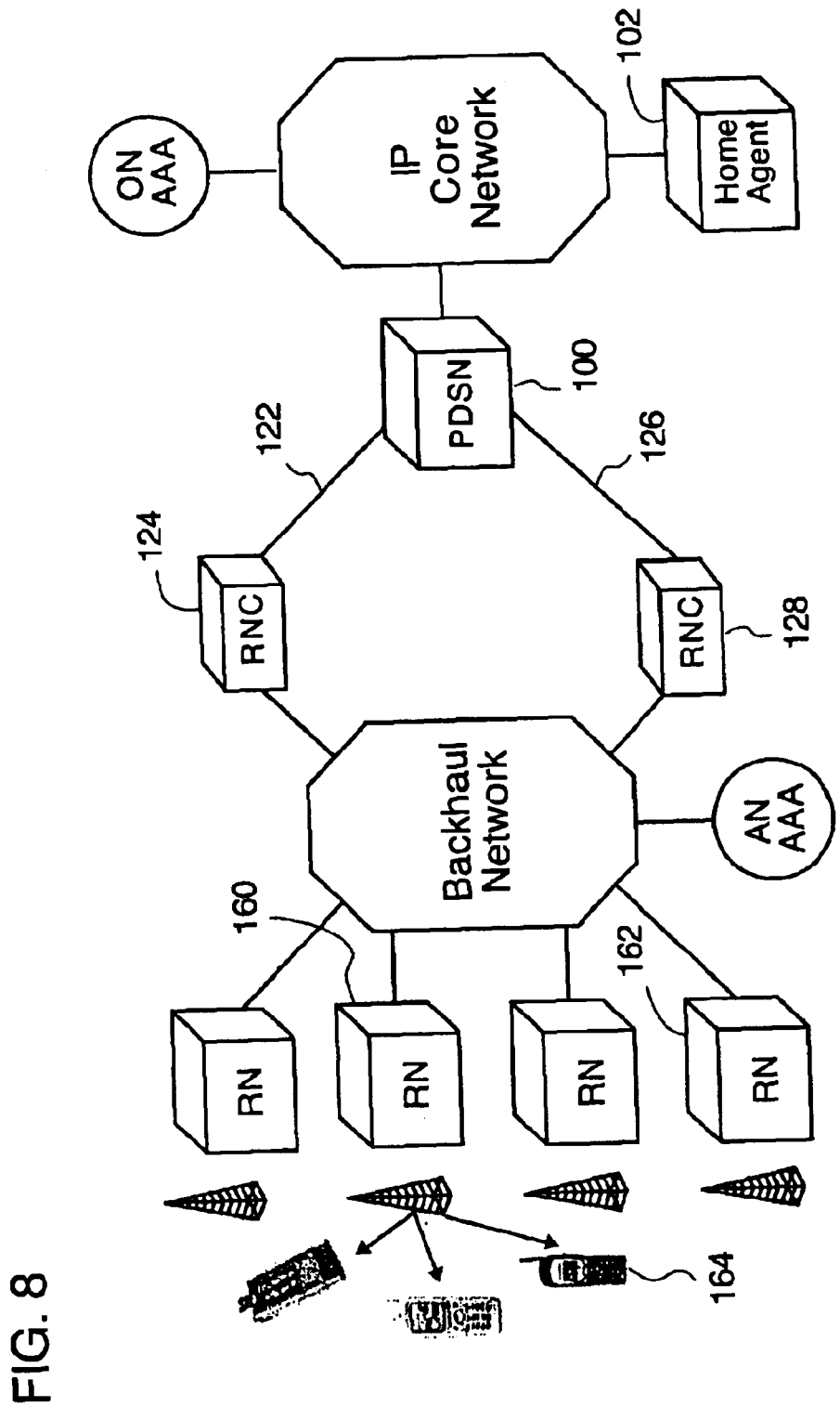

As shown in FIG. 8, to support IP multicast in the CDMA2000 family of standards (including IS-856), one can use either the PDSN 100 (Simple or Mobile IP) or the Home Agent 102 (only in Mobile IP) as the multicast router. When the Home Agent is the multicast router, an AT 104 who is connected via a PDSN in a visitor network receives multicast packets through the Home Agent.

Figure 9:
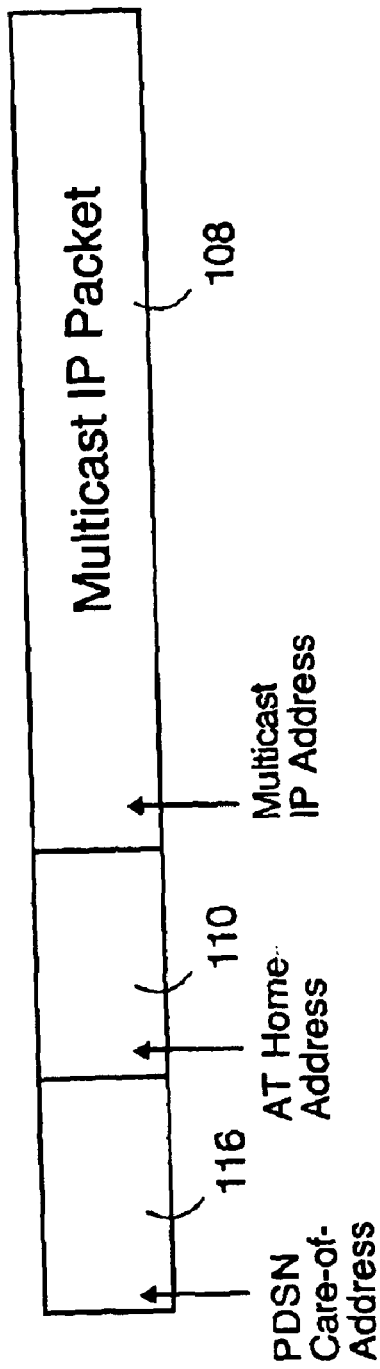

As shown in FIG. 9, the Home Agent uses double encapsulation to tunnel multicast packets to the PDSN. In double encapsulation, a multicast IP packet 108 is first encapsulated in an IP packet that has as its destination address the (unicast) home address of the AT 110, and then encapsulated again in an IP packet that has as its destination address the care-of-address of the PDSN 116. The first encapsulation allows the PDSN to determine the identity of the recipient AT for the multicast packet. Here we are assuming that the PDSN is unaware of the membership list of a multicast group and therefore is not able to forward IP packets based on a multicast address.

Note that in contrast to basic multicast routers, a multicast router in a Home Agent must keep track of multicast group members. When it receives a multicast IP packet, it first determines by route look-up the home address of the AT and the care-of-address of PDSN that is currently serving the AT. It then encapsulates the multicast IP packet as described above. The PDSN determines the recipient AT from the home address in the inner IP header and transmits the encapsulated multicast IP packet to that AT over the PPP link. In the AT, the received IP packet is first de-capsulated to obtain the multicast IP packet which is then passed on to the transport layer (typically UDP). The transport layer then delivers the packet to the multicast application via some socket layer interface. Note that this method does not require any special multicast support in the PDSN.

When the PDSN is the IP multicast router, a multicast packet arrives at a PDSN directly without having to go through the Home Agent. In this case, the PDSN knows the home addresses of all the AT's that belong to a given multicast group. It then forwards the packet to those AT's over the PPP link.

When the Home Agent is the multicast router, all multicast messages sent by the Access Terminal 104 (FIG. 8) are reverse tunneled to the Home Agent. Reverse tunneling is implemented using the "encapsulating style of delivery" method defined in RFC 2344. In this method, the AT first tunnels the multicast packets to the PDSN over the PPP link using the AT's home address as the source address of multicast IP packets. The PDSN de-tunnels these packets, and re-tunnels them again to the Home Agent using its own care-of-address as the source address. Such reverse tunneling is required because IP multicast routing requires the source address of a multicast packet to be topologically correct.

When the PDSN is the multicast router, an AT may use a similar approach to send multicast packets, except this time it uses the care-of-address of the PDSN as the source address of the multicast IP packet and the PDSN routes the de-tunneled packet directly towards the Internet. Again, multicast packets are sent from the AT to the PDSN over the PPP link.

One advantage of making the Home Agent the IP multicast router is that it allows an AT to remain connected to a multicast group even after handing off to another PDSN. When the PDSN is the multicast router, every time the AT performs an inter-PDSN handoff, it needs to rejoin the multicast group.

The method outlined above can be implemented with existing 3GPP2 Wireless Internet standards (IS-835) by adding multicast routing support to PDSN's or Home Agents, and by supporting the double encapsulation method described above in both PDSN's and Home Agents when the multicast router is in the Home Agent. When the number of AT's in a multicast group is very small (say, 1 or 2), this method can also be reasonably efficient. However, as the size of the multicast group grows, this approach becomes inefficient, since IP packets are transmitted multiple times between the Home Agent and the PDSN, between the PDSN and the Access Network, and most importantly between the Access Network and the AT's, using up excessive air link resources.

Furthermore, the IGMP protocol is designed primarily for Ethernet networks with plenty of bandwidth and low error rate, and is not as suitable for wireless links. To see this, we examine the operation of IGMP on wireless links in more detail. As mentioned earlier, in IGMP when a new AT wants to join a multicast group, it sends an IGMP Host Membership message to the multicast router (PDSN or Home Agent). To ensure that the message is correctly received by the PDSN, the AT may actually send the same message a few times. In typical use of IGMP with Ethernet-attached hosts, the router does not need to know the identity of each host on its subnet that belongs to a multicast group. It is sufficient for it to know that there is at least one host member of the multicast group attached to an interface. However, in the wireless application considered here, the multicast router (PDSN or Home Agent) needs to know the identity of the AT's in the multicast group in order to be able to forward multicast IP packets to them over individual PPP links.

As we saw earlier, in IGMPv1 there is no explicit Leave Group message for the AT's to notify the PDSN or Home Agent when they leave a multicast group. In the wireless application considered here, after an AT has left a multicast group, the multicast router (PDSN or Home Agent) continues to forward packets to that AT over a PPP link until the last AT in the subnet has left the group. This wastes air link resources, when AT's terminate group memberships at different times.

The Leave Group message in IGMPv2 somewhat improves the situation. In order to prevent an unneeded multicast packet from being sent to it, an AT must send a Leave Group message to the multicast router (PDSN or Home Agent) when it is leaving a multicast group. To conserve air link bandwidth, the PDSN may suppress sending a Query specific to the multicast group for which the LeaveGroup message was received. However, this requires that the messages that the AT's send (when they join or leave a multicast group) are reliably received by the PDSN or Home Agent. This will ensure that the PDSN or the Home Agent has up-to-date information on group memberships. Reliable IGMP message transmission can be achieved using a retransmission protocol.

Even with the modifications mentioned above, IP multicast as outlined will be inefficient when multicast groups have large memberships because then multicast packets are sent over the radio access network using unicast transmission. In the next section, we describe an alternative approach, which illustrates how the common control channel in IS-856 can be used to address these issues.

IP Multicast/Broadcast Using the Common Control Channel

Figure 7:
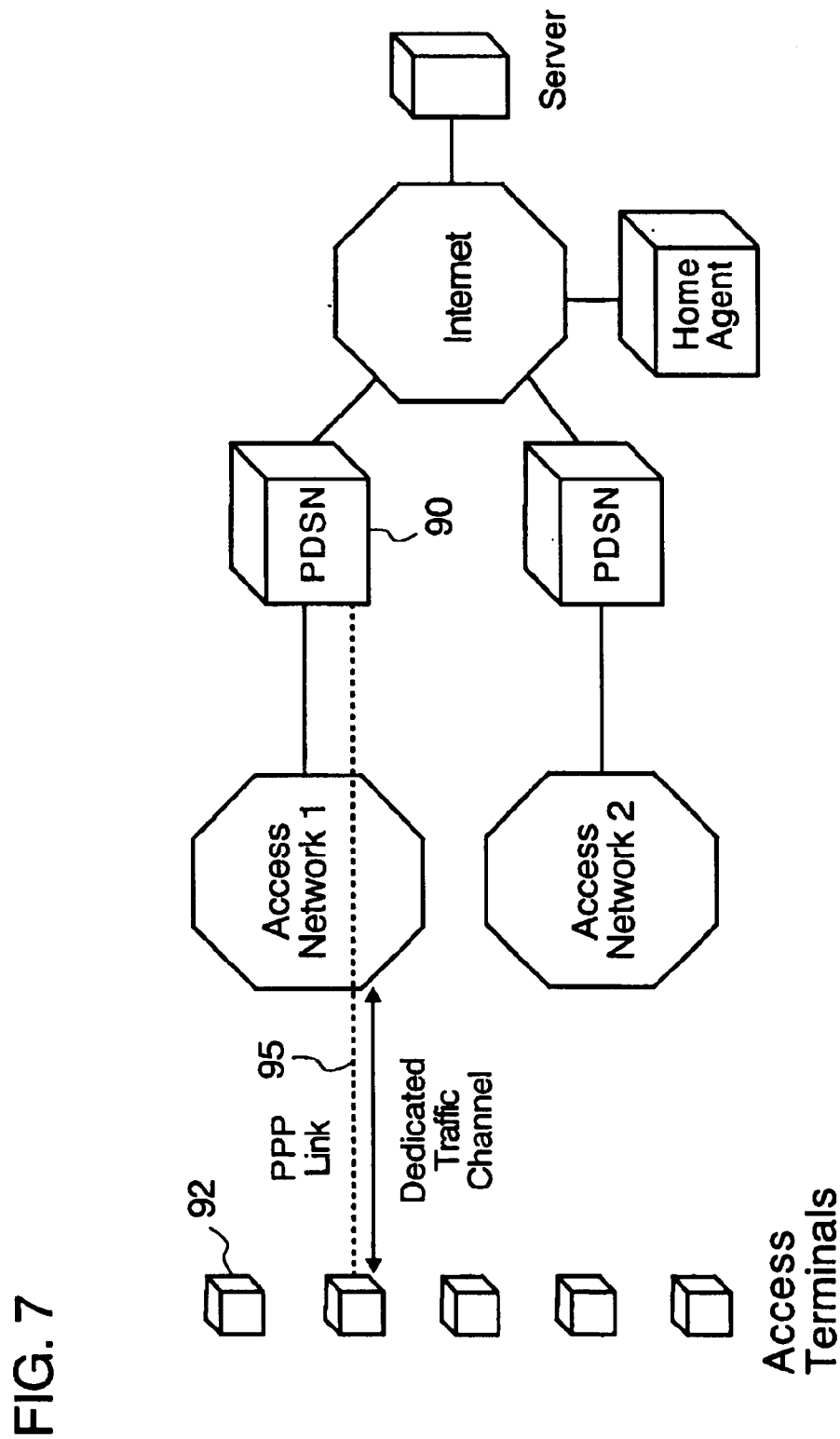

As mentioned earlier, in CDMA 2000 packet data networks, the PDSN maintains a PPP link with each AT (FIG. 7). PPP is a link layer protocol which provides framing, protocol multiplexing and error detection, among other things.

As a stateful point-to-point link layer protocol, PPP is not suitable for sending packets from the network to multiple AT's over a common data channel such as the IS-856 control channel. For IP multicast/broadcast over a common control channel, we propose the use of a light-weight link-layer protocol between the PDSN and the AT, providing framing and error detection features similar to those of PPP, but with no set-up procedures. In other words, the Link Layer protocol may use byte-oriented HDLC framing, without idle fills, an 8-bit protocol identifier and a 16 (or 32)-bit Frame Check Sequence. In what follows, we will refer to this protocol as the Simple Link Layer Protocol (SLLP).

As mentioned earlier, either the PDSN or the Home Agent can act as the multicast router in IS-856 networks. First, consider the case where the PDSN is the multicast router and assume that there exists a PPP link between each AT and the PDSN. This PPP link is used to carry bidirectional unicast traffic, multicast traffic originating in the AT, as well as any signaling that relates to the operation of IP multicast. The AT sends multicast packets over the PPP link using the same procedure as those described earlier. For each PPP link, there also exists an A10 IP tunnel 122 to carry bi-directional unicast traffic between the PDSN and the RNC 124.

We describe how multicast traffic can be carried efficiently from the PDSN 100 to the AT 104. First, in order to carry multicast traffic between the PDSN and the RNC 124, a special multicast A10 tunnel 122 is set up for every multicast group that has at least one member served by that RNC. The same PDSN may have multiple A10 tunnels 122, 126 to different RNC's 124, 128 for the same multicast group. When the PDSN receives an IP packet that belongs to a multicast group, it encapsulates it in a Simple Link Layer frame, and sends it over these multicast A10 tunnels to RNC's that serve members of that multicast group. How the A10 tunnels are set up will be described later.

When an RNC receives an IP packet over a multicast A10 tunnel, it first determines from the A10 Tunnel ID, typically placed in the Key field of the Generic Routing Encapsulation (GRE) header, the multicast group that the packet belongs to and removes the tunnel headers to obtain a sequence of octets. These octets are then sent to the AT's that belong to the multicast group, as will be described next.

IS-856 defines two default protocols for exchanging data between access terminals and access networks:

Default Signaling Protocol. This provides the means to carry signaling messages between the Access Network and the Access Terminal. The Default Signaling Protocol consists of a messaging protocol (Signaling Network Protocol) and a link layer protocol that provides message fragmentation, retransmission and duplicate detection (Signaling Link Protocol). The Default Signaling Protocol uses the identifier 0x0000.

Default Packet Protocol. The Default Packet Protocol consists of a link layer protocol that provides octet retransmission and duplicate detection (Radio Link Protocol). This protocol is used to transparently carry link layer traffic between a link layer network termination point and an Access Terminal (AT). The Default Packet Protocol uses the identifier 0x0001 when the termination point is a PDSN. It uses the identifier 0x0002 when the termination point is the Access Network (this is used for terminal authentication).

In what follows, we define a new protocol, Broadcast/Multicast Packet Protocol, to support broadcast and multicast services. We will assign to this protocol, for example, the identifier 0xFFFE. It is important that no other protocol used in the network be assigned this identifier.

When an AT joins a multicast group (see the discussion in the next section), the RNC, upon receiving this information from the PDSN, initiates the procedures to negotiate the Broadcast/Multicast Packet Protocol using the Generic Configuration Protocol. The specific rules of the configuration exchange can be programmed by the operator based on service needs. During this negotiation, the RNC assigns the AT a 32-bit multicast ATI. There is a unique one-to-one relationship between the Multicast ATI and the Multicast A10 tunnel. Once the Packet Broadcast/Multicast Application has been negotiated, the RNC can start sending broadcast/multicast data to AT's.

Figure 10:
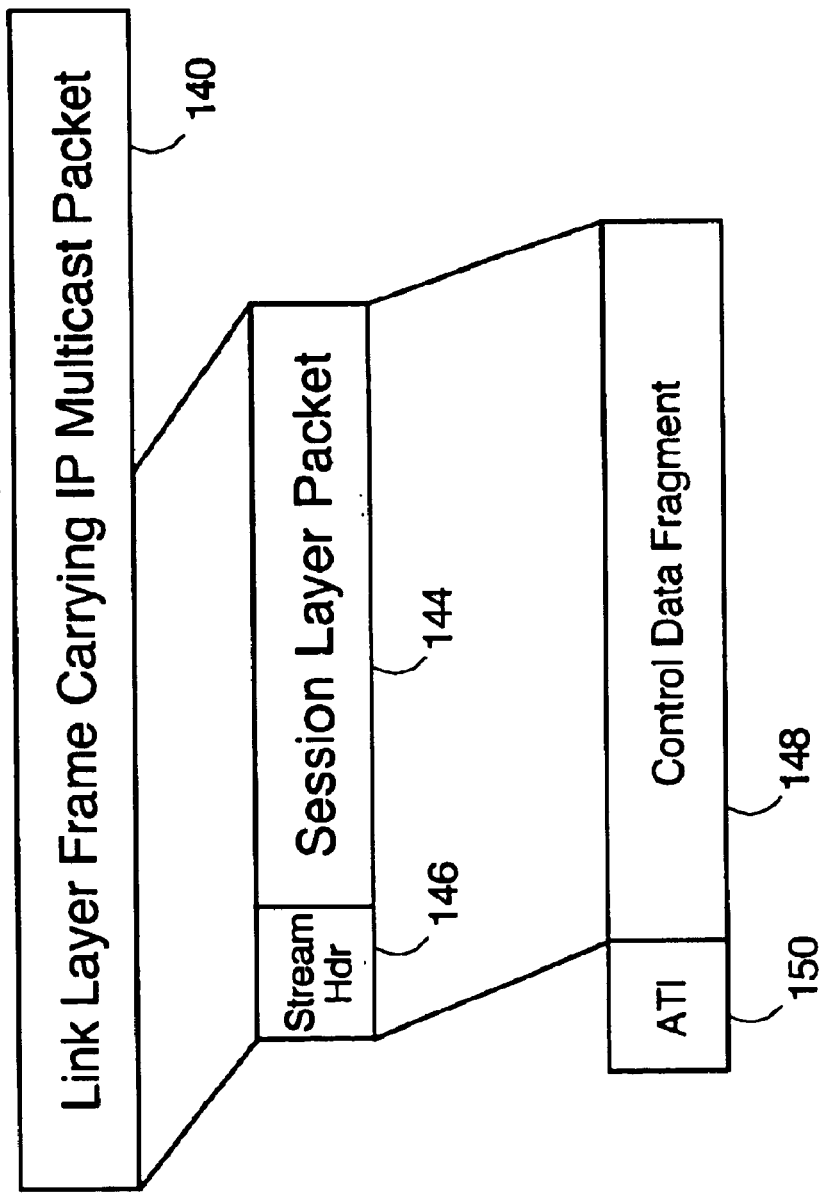

As shown in FIG. 10, when the RNC receives a multicast packet 140 over a Multicast A10 tunnel, it de-tunnels the received packet to obtain the link layer frames and sends them over the IS-856 common control channel using the Multicast ATI (or Broadcast ATI if it arrived on a broadcast A10 tunnel) in the ATI Record. Specifically, the RNC segments the link layer frames received from the PDSN into so-called Session Layer packets 144. Each Session Layer packet carries a 2-bit Stream Layer header 146 that identifies the packet as a Broadcast/Multicast Protocol packet. The Session Layer packet represents a control data fragment 148 and is then placed in a 1002-bit MAC Layer Control Channel packet as described in FIG. 4. The length of the Stream Layer packet is chosen as long as possible to completely fill the MAC Layer packet. When there is not enough data to fill the MAC Layer packet, the Stream Layer packet may be multiplexed with Stream Layer packets destined to other users. In either case, the fragment header 150 that precedes the Session Layer packet inside the MAC Layer packet carries the ATI record which identifies the data as belonging to a broadcast or a specific multicast group.

The Packet Broadcast/Multicast Protocol, like the Packet Data Protocol defined in IS-856, may use a NAK-based Radio Link Protocol to reduce the error rate with retransmissions. However, this has shortcomings: (1) A large number of AT's can result in significant reverse link traffic, (2) An error in one AT may delay reception of data in other AT's. Alternatively, forward error correction may be used. As a form of trivial coding, multiple transmissions can also be used.

When the RNC serves users from several Radio Node's 160, 162 (FIG. 8) (RN's), it tunnels unicast copies of the air link frames carrying the IP packets to all these RNs. These RN's in turn send the air link frames over the air via all the sectors they support, using the common control channel as described in the previous section. This is wasteful of both backhaul and air link bandwidth, particularly when the multicast group members are sparsely located. In order to solve this problem, the RNC maintains a list of membership 164 for each multicast group supported in the network. How this may be accomplished will be discussed later.

If the RNC were to know the identity (e.g., UATI) of the Access Terminals in each multicast group, it could forward an incoming multicast packet only to those sectors that have a member in that multicast group. This requires the RNC to keep track of the position of Access Terminals. This is normally accomplished by requiring the AT's to send distance-based Route Update messages to update their location when they move too far away from the position of their last report.

The description above assumes that the PDSN is the multicast router. A similar approach can be used when the Home Agent is the multicast router. However, in this case an additional protocol is needed between the PDSN and the Home Agent in order to ensure that the PDSN can correctly map incoming multicast packets to an appropriate A10 multicast tunnel. In this case, whenever an AT joins a multicast group through its Home Agent, the Home Agent communicates with the PDSN to establish a (possibly multicast) tunnel between the Home Agent and the PDSN. The PDSN in turn establishes a multicast A10 tunnel to the RNC. When the Home Agent receives an IP packet that belongs to the multicast group of an AT, it encapsulates the packet in another IP packet and sends it to the PDSN. The PDSN recovers the original IP multicast packet, and forwards it over the multicast A10 tunnel(s) to the RNC based on the IP multicast address. Note that in this scenario, the PDSN does not need to be a full-fledged multicast router, but it needs to support the multicast tunneling procedure described above.

Group Address Management

As explained earlier, address management in IP Multicast is handled using the IGMP protocol. IGMP provides dynamic address management, allowing hosts to join or leave a multicast group on demand.

IGMP can be used in IS-856 networks as described earlier. All IGMP signaling messages can be exchanged using dedicated PPP links between the PDSN and AT's. When an AT wants to join a multicast group, it sends an IGMP Host Membership message to the multicast router (PDSN or Home Agent) over the PPP link. Similarly, when the AT wants to leave a multicast group, it sends an IGMP Leave Group message.

Some modifications to the IGMP protocol may be desirable, however, in order to deal with the low bandwidth and high error rate of wireless links. For example, the PDSN needs to use the IGMP Query message rather sparingly, so as to not produce excessive reverse link traffic. In order to deal with error conditions, IGMP Host Membership and Leave Group messages may be sent more reliably to ensure correct reception. Even though IS-856 does support a Radio Link Protocol (RLP) between the RNC and Access Terminal, this protocol only supports one retransmission. If a retransmitted RLP packet is lost, no further attempt is made to recover from this error condition. A more powerful retransmission protocol may be introduced to further reduce the probability of error.

Errors in IGMP can be most troublesome for the Leave Group message, since they might lead to unnecessary transmission of multicast packets over the air, after the last member of a group in a given sector has departed. This problem can be addressed by occasional transmission of the Query message by the PDSN.

As we saw earlier, it is not sufficient for the PDSN (or Home Agent) to know the exact multicast membership list on each one of its interfaces. Each RNC also needs to know in which sector each group member resides so that multicast traffic is not unnecessarily sent over sectors that don't have any members. Further, in a typical scenario where the RNC consists of an RNC serving many RN's, excessive backhaul traffic could be generated when the RNC forwards multicast packets to RN's that do not have any members listening on that multicast address.

Accordingly, the RNC needs to keep track of membership lists 164 of each multicast group. In the current CDMA 2000 Packet Data Architecture, an easy way to accomplish this is for the RNC to get this information from the PDSN. (Here, we assume the PDSN is the multicast router. When the Home Agent is the multicast router group membership information has to be sent first from the Home Agent to the PDSN.) Every time an AT joins or leaves a multicast group, the PDSN would send a Multicast Group Update message 170 to the RNC informing it of the identity of the AT. This message may be sent over the A11 signaling interface between the RNC and the PDSN. The identity of the AT may simply be an identifier of the unicast A10 tunnel over which the IGMP message was received. The RNC, in turn can map this information into the UATI of the Access Terminal. When the RNC receives a Multicast Group Update message indicating that an AT has joined a multicast group for which a multicast A10 interface does not exist, it immediately initiates the procedure to set up the multicast A10 tunnel. It then initiates the configuration of the Broadcast/Multicast Protocol with the Access Terminal as described in the previous section.

(Alternatively, the RNC can listen for IGMP messages being carried over all PPP links. However, this would be expensive. When the Home Agent is acting as the multicast router, however, it is considerably simpler for the PDSN to read the IGMP messages—so additional transfer of membership lists from the Home Agent to the PDSN may be unnecessary. In future packet data architectures, the data link layer protocol may terminate in the RNC. In this case, reading IGMP messages in the RNC will become simplified.)

Group management based on IGMP can support dynamic multicast groups, with users joining and leaving multicast groups frequently. In IGMP, messages to join or leave multicast groups must be sent by the host. In early wireless multicast applications, the subscriber and the operator may be actively involved in forming multicast groups at subscription time. For example, an alternative model of group address management could work as follows.

A subscriber who wants to join a specific multicast group managed by the operator may simply go to a specific web site, where he/she would enter the appropriate information, including possibly credit card information, to join or leave the group. This information would then be saved in a AAA (Radius) server 172. The Home Agent would obtain the information from the AAA server. If the subscriber has a session with the Home Agent, the Home Agent would in turn send a Membership Update report to the PDSN where the subscriber is located to initiate multicast service delivery to that subscriber. Otherwise, this procedure would take place when the Mobile IP session with the Home Agent is established.

Similarly, when the user wants to leave a multicast group, it would go to the same web site of the operator and enter the appropriate information indicating his departure from the multicast group.

One advantage of this approach is that the entire process of signing on and off is handled using standard web interfaces (e.g., browsers) and does not require the explicit support of IGMP in the wireless terminals. The only facility that is required is for the mobile terminal to configure its driver interfaces to accept broadcast and multicast traffic. Over-the-air provisioning concepts can be applied to perform this configuration remotely in a secure manner.

Simpler yet, broadcast/multicast group membership can be handled at subscription time. Group membership information is then automatically entered into the database of a AAA server.

Other implementations are within the scope of the following claims.

What is claimed is:

1. A method comprising
   in a radio access network, delivering multicast packets each identified by a multicast network layer address representing a multicast group of access terminals,
   the multicast packets being delivered in one or more air link frames using a common channel that is shared among access terminals in a sector, each airlink frame carrying a multicast air link address that identifies the multicast group of terminals.

2. The method of claim 1, wherein the common channel comprises the control channel of IS-856.

3. The method of claim 1, wherein the multicast air link address comprises a broadcast or multicast Access Terminal Identifier (ATI).

4. The method of claim 1, wherein the multicast packets are sent to the radio access network from a router.

5. The method of claim 4, wherein the router comprises a packet data serving node, and the multicast packets are sent to the radio access network using a multicast network layer tunnel.

6. The method of claim 5, wherein the network layer tunnel comprises an IP tunnel using a Generic Routing Encapsulation (GRE) protocol.

7. The method of claim 5, wherein the router uses a stateless simple link layer protocol to frame the network layer multicast packets for transmission to the access terminals.

8. The method of claim 1 further including enabling an access terminal to join or leave a multicast group.

9. The method of claim 8 wherein an access terminal joins a multicast group by sending a message to a multicast router.

10. The method of claim 9 wherein the multicast router comprises a Packet Data Serving Node (PDSN) or a Home Agent (HA).

11. The method of claims 9 and 10 wherein an access terminal joins a multicast group by registering out-of-band at a web server, and the multicast router obtains the registration information from the web server.

12. The method of claim 11 wherein the packets are sent to the radio access network using a reliable protocol involving error detection and retransmission.

13. A method comprising
in a radio network, sending multicast packets from a router to a radio access network using a multicast network layer tunnel,
the router comprising a packet data serving node and using a stateless simple link layer protocol to frame the network layer multicast packets for transmission to access terminals in a sector.

14. The method of claim 1, wherein the radio access network sends a multicast page to multiple terminals in order to wake them up before the transmission of multicast data starts.

15. The method of claim 13, wherein the network layer tunnel comprises an IP tunnel using a Generic Routing Encapsulation (GRE) protocol.

16. The method of claim 1 wherein said airlink frames are sent repetitively in multiple Control Channel Cycles in order to reach dormant terminals.

17. A method comprising
in a radio network, sending multicast packets from a router to a radio access network,
the router using a stateless simple link layer protocol to frame the network layer multicast packets for transmission to access terminals in a sector,
wherein the router comprises a Packet Data Serving Node (PDSN) or a Home Agent (HA).

* * * * *